United States Patent [19]
Weston et al.

[11] Patent Number: 5,790,303
[45] Date of Patent: Aug. 4, 1998

[54] SYSTEM FOR AMPLIFYING AN OPTICAL PULSE USING A DIODE-PUMPED, Q-SWITCHED, INTRACAVITY-DOUBLED LASER TO PUMP AN OPTICAL AMPLIFIER

[75] Inventors: Jeremy Weston, San Jose; William Eugene White, San Ramon; Leigh John Bromley, Palo Alto; Frank Godwin Patterson, Danville, all of Calif.

[73] Assignee: Positive Light, Inc., Los Gatos, Calif.

[21] Appl. No.: 787,991

[22] Filed: Jan. 23, 1997

[51] Int. Cl.$^6$ .................... H01S 3/00; H01S 3/093
[52] U.S. Cl. ............... 359/345; 359/348; 372/72
[58] Field of Search ................ 359/345, 347, 359/348; 372/70, 72

[56] References Cited

U.S. PATENT DOCUMENTS

| | | | |
|---|---|---|---|
| 3,914,709 | 10/1975 | Pike et al. | 331/94.5 |
| 4,896,119 | 1/1990 | Williamson et al. | 330/4.3 |
| 4,910,740 | 3/1990 | Oka | 372/22 |
| 5,034,951 | 7/1991 | Edelstein et al. | 372/22 |
| 5,084,879 | 1/1992 | Suzuki et al. | 372/22 |
| 5,136,597 | 8/1992 | Nightingale | 372/21 |
| 5,249,190 | 9/1993 | Kortz et al. | 372/22 |
| 5,278,852 | 1/1994 | Wu et al. | 372/22 |
| 5,295,144 | 3/1994 | Lawrence-Stolz et al. | 372/22 |
| 5,296,960 | 3/1994 | Ellingson et al. | 359/330 |
| 5,333,145 | 7/1994 | Hyuga et al. | 372/69 |
| 5,406,408 | 4/1995 | Ellingson et al. | 359/330 |
| 5,420,876 | 5/1995 | Lussier et al. | 372/22 |
| 5,430,754 | 7/1995 | Suzuki et al. | 372/92 |
| 5,440,574 | 8/1995 | Sobottke et al. | 372/34 |
| 5,446,749 | 8/1995 | Nighan, Jr. et al. | 372/22 |
| 5,450,429 | 9/1995 | Klemer et al. | 372/22 |
| 5,463,649 | 10/1995 | Ashby et al. | 372/40 |
| 5,473,626 | 12/1995 | Fan et al. | 372/105 |
| 5,479,431 | 12/1995 | Sobbottke et al. | 372/92 |
| 5,511,085 | 4/1996 | Marshall | 372/22 |
| 5,521,932 | 5/1996 | Marshall | 372/36 |
| 5,572,358 | 11/1996 | Gabl et al. | 359/347 |
| 5,583,882 | 12/1996 | Miyai et al. | 372/103 |

OTHER PUBLICATIONS

"Quanta-Ray® Ti:Sapphire Amplifier with Pulse Stretcher and Compressor", Spectra-Physics Lasers, Feb., 1994.

*Primary Examiner*—Mark Hellner
*Attorney, Agent, or Firm*—Carr & Ferrell LLP

[57] ABSTRACT

An efficient, powerful and reliable system for amplifying optical pulses. Seed-pulses are generated by a seed-pulse source and are transmitted to an optical amplifier for amplification. The power for the amplification is provided by a Q-switched, diode-pumped, intracavity-doubled pump laser.

52 Claims, 5 Drawing Sheets

SYSTEM FOR AMPLIFYING AN OPTICAL PULSE USING A DIODE-PUMPED, Q-SWITCHED, INTRACAVITY-DOUBLED LASER TO PUMP AN OPTICAL AMPLIFIER

BACKGROUND OF THE INVENTION

1. Field of the Invention

This invention relates generally to the field of lasers, and more particularly to lasers for pumping optical amplifiers.

2. Description of the Background Art

Known amplifier systems employ a source laser, an amplifier, and a pump source to transfer energy to the amplifying medium, to generate amplified laser light. The source laser emits a beam of laser light that is amplified as it passes through the amplifier. The energy for the amplification is provided to the amplifier by the pump source, which is typically a laser. A pump laser generally includes a laser medium element, positioned between a high reflector and an output coupler, and a pumping means. The pumping means excites the atoms of the medium element into a metastable state. The relaxation of the excited atoms is accompanied by the emission of light, which is reflected back and fourth between the high reflector and the output coupler, and the growing reflected wave induces the emission of additional light into the reflected wave state. As the wave continues to grow, the output coupler allows a portion of the reflected light to pass as the output beam of the pump laser.

It is obviously desirable that the pump laser be efficient, powerful, reliable, and convenient to set up and operate, but often there is tension between these various design objectives. For example, diode lasers provide a very efficient pumping means and are more durable than lamps, but the output energy of known diode-pumped lasers has been too low for them to function effectively as amplifier pumping lasers. Further, some prior diode-pumped systems require that the pitch of the diode emitters be carefully matched and aligned to the optical path within the media element, reducing convenience of assembly.

More powerful pump lasers exist, but in each case the power increase comes at the expense of one of the other design objectives. For example, more power can be obtained by using gas filled lamps to excite the pump laser lasing medium, but these systems are less efficient, less reliable, and less robust. Additionally, such lasers generally have significant cooling requirements and require a special power service, as opposed to a standard 110 V AC outlet.

Thus, there is a need for a laser amplifier system capable of producing an output that is orders of magnitude higher in energy than known diode-pumped systems. It is also desirable that the amplifier system be efficient, reliable, and convenient to set up and operate.

SUMMARY OF THE INVENTION

The present invention is an efficient, powerful and reliable optical amplification system. Seed-pulses are generated by a seed-pulse source and are transferred to an optical amplifier for amplification. The power for the amplification is provided by a Q-switched, diode-pumped, intracavity-doubled amplifier pump laser.

One embodiment of the amplifier pump laser includes a laser medium element that is pumped by a plurality of diode lasers to emit a beam of light at a first frequency along an optical path passing through the element. The pump laser also includes at least one reflector and an output coupler, for redirecting the beam along the optical path to establish an optical resonator. A Q-switch is disposed in the optical path to selectively frustrate or permit optical resonance, thereby enabling the laser to produce high-power output pulses, as opposed to low-power, continuous output. The output power of the pump laser is further enhanced by including a doubling crystal within the optical cavity. The doubling crystal is disposed in the optical path and converts a portion of the original oscillating wave to a new wave having twice the frequency of the original. The output coupler is highly reflective to the original frequency, but highly transmissive to the doubled frequency, and, therefore, passes the doubled frequency wave as output.

There are several specific embodiments of the amplifier pump laser of the present invention. One embodiment is characterized by a beam that is directed between two reflectors, along a folded optical path, by a beam director and an output coupler. Another embodiment is characterized by a straight optical path between one reflector and the output coupler. Finally, there are unidirectional and bi-directional ring configured embodiments.

One embodiment of the optical amplifier of the present invention is a regenerative amplifier which includes a gain medium element within an optically resonant cavity, a capturing means for switching seed-pulses into the cavity, and an ejecting means for switching amplified pulses out of the cavity. The output beam of the amplifier pump laser excites the gain medium, which amplifies the seed-pulse as it oscillates within the cavity. After amplification, the ejecting means switches the amplified pulse out of the cavity as the amplification system output.

Other embodiments of the optical amplifier include a ring configured regenerative amplifier and a multi-pass "bow-tie" amplifier.

DETAILED DESCRIPTION OF A PREFERRED EMBODIMENT

The present invention provides an efficient, powerful, reliable, and convenient optical amplification system. Numerous details, such as the number of diode lasers and the use of a regenerative amplifier, are provided for the sake of clarity, but it will be obvious to those skilled in the art that the invention can be practiced apart from these specific details. In other instances, details of well known equipment and processes are omitted so as not to obscure the invention.

Figure 1:
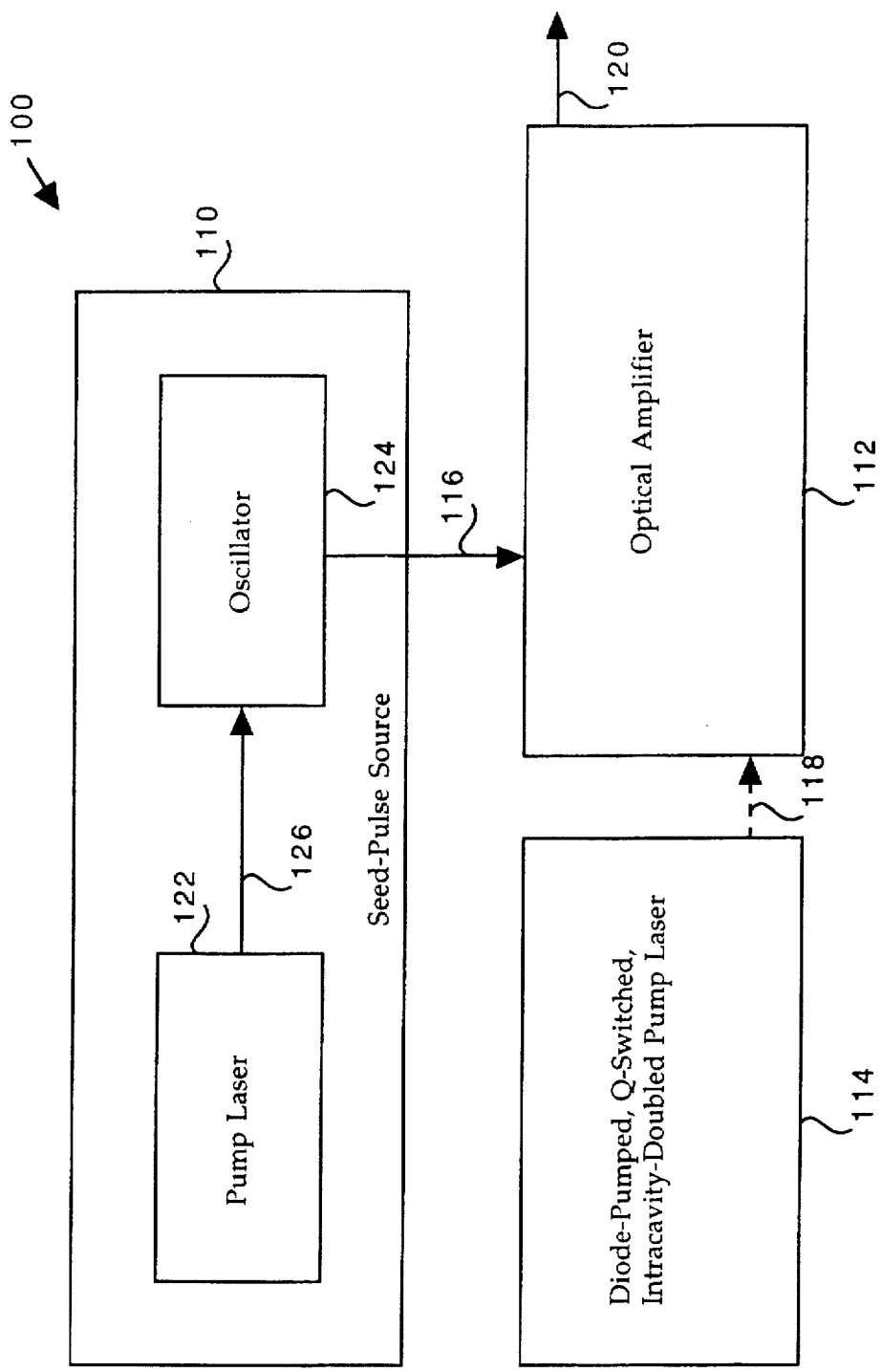
FIG. 1 is a block diagram of the preferred optical amplification system of the present invention.

FIG. 1 shows an optical amplification system 100, including a seed-pulse source 110, an optical amplifier 112, and an amplifier pump laser 114. Seed-pulse source 110 generates seed-pulses and sends them via optical path 116 to optical amplifier 112. Amplifier pump laser 114 generates pump pulses which are directed along optical path 118 into amplifier 112. Amplifier 112 uses the optical energy of the pump pulses to amplify the seed-pulses and emits the amplified pulses along optical path 120.

Seed-pulse source 110 includes pump laser 122 and oscillator 124. Pump laser 122 provides optical energy, via optical path 126, which excites oscillator 124 to emit the seed-pulses along optical path 116. In the preferred embodiment, pump laser 122 is a continuous-wave laser and oscillator 124 is a titanium-sapphire oscillator. Seed-pulse sources are well known in the art, and therefore will not be discussed in greater detail.

Figure 2:
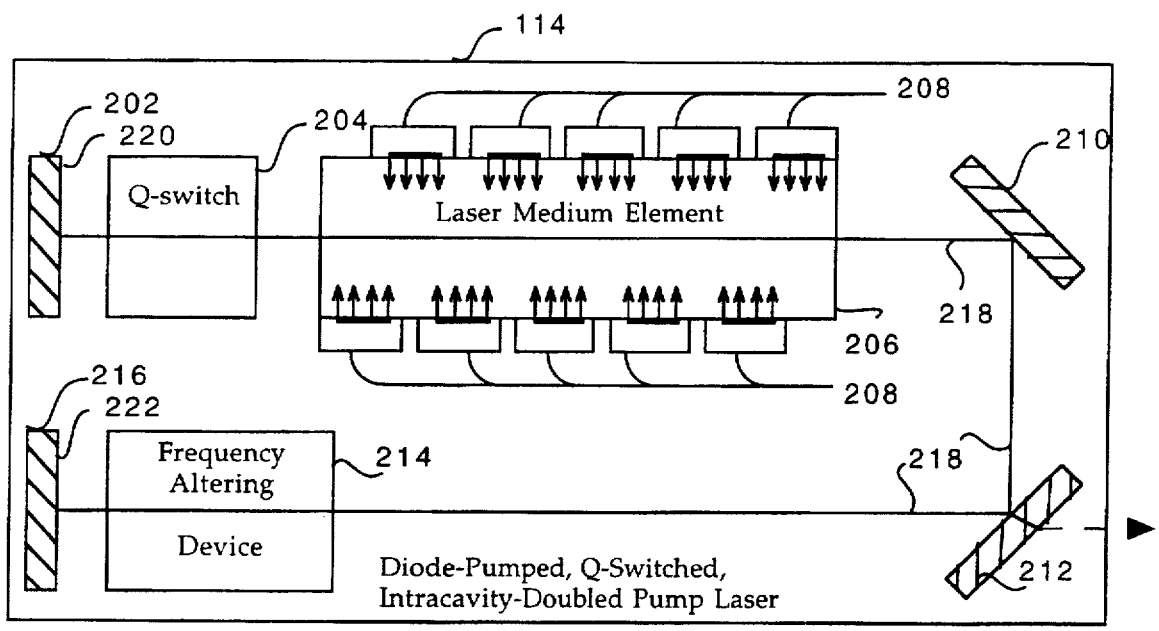
FIG. 2 is a block diagram of the diode-pumped, Q-switched, intracavity-doubled pump laser of FIG. 1.

FIG. 2 shows a detailed view of amplifier pump laser 114, including a first reflector 202, a Q-switch 204, a laser medium element 206, a plurality of diode lasers 208, a second reflector 210, an output coupler 212, a frequency altering device 214, and a third reflector 216. In the preferred embodiment, laser medium element 206 is a cylindrical rod of neodymium-doped yttrium-lithium-fluoride (YLF), but those skilled in the art will understand that the invention may be practiced with alternate active elements, such as erbium (Er) holmium, (Ho) or thorium (Th), or alternate carriers such as glass, vanadate, or yttrium-scandium-gallium-garnet (YSGG). Diode lasers 208 are disposed along the lateral surface of laser medium element 206, and when provided with electrical current emit laser light into element 206 which excites the atoms of element 206 to a metastable state. The relaxation of the excited atoms is accompanied by the emission of light of a first frequency (w), some of which travels along a folded optical path 218.

Reflectors 202 and 216 are positioned at opposite ends of optical path 218, and each respectively has a reflective surface 220 and 222 which is substantially perpendicular to an incident segment of optical path 218. Therefore, any light traveling along optical path 218 which is incident on either reflector 202 or 216 is reflected back along optical path 218. Reflector 210 and output coupler 212 fold optical path 218 to pass between reflectors 202 and 216, through Q-switch 204, laser medium element 206 and frequency altering device 214. As the light oscillates back and forth between reflectors 202 and 216, the growing reflected wave induces the emission of additional light into the reflected wave state, thus amplifying the reflected wave.

Q-switch 204 is disposed in optical path 218 between reflector 202 and laser medium element 206 and selectively frustrates or permits oscillation. When oscillation is frustrated, the excited atoms are not induced to emit light, and the number of excited atoms can, therefore, be greatly increased. Then, when Q-switch 204 permits oscillation, a powerful pulse will be generated as the large number of excited atoms drop to the lower state, emitting light as they make the transition. Many Q-switching arrangements are known, including, but not limited to, bleachable absorbers that become transparent under illumination, rotating prisms and mirrors, mechanical choppers, ultrasonic cells, and electro-optic shutters such as Kerr or Pockels cells. The present invention contemplates the use of any such switching device.

Frequency altering device 214 is disposed in optical path 218, between reflector 216 and output coupler 212. In the preferred embodiment, frequency altering device 214 is a lithium-triborate (LBO) doubling crystal, but those skilled in the art will understand that the invention may be practiced with alternative doubling crystals, including but not limited to beta-barium-borate (BBO), potassium-titanyl-phosphate (KTP) and potassium-dihydrogen-phosphate (KDP). As the light of frequency (w) emitted by laser medium element 206 travels along optical path 218 through device 214, the frequency of a portion of the beam is doubled, creating a second wave at the doubled frequency (2w). Output coupler 212 is designed to be highly reflective to the first frequency (w) but transparent to the second (2w) frequency, and therefore passes the second (2w) wave as an output pulse along optical path 118. The intracavity disposition of device 214 is advantageous over prior art systems which positioned the doubling crystal between the amplifier pump laser and the optical amplifier. Since the reflected (w) wave makes multiple passes through device 214, the doubling efficiency is greatly increased, resulting in an increase in output power.

Figure 3:
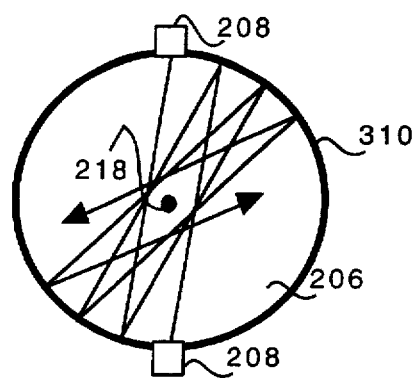
FIG. 3 shows an end view of the laser medium element of FIG. 2.

FIG. 3 shows an end view of laser medium element 206, taken along optical path 218. The plurality of diode lasers 208 are disposed along the circumference of medium element 206 which, except for openings through which diode lasers 208 emit their light, is surrounded by a highly reflective material 310. The reflective material 310 increases efficiency by insuring that the light emitted by diode lasers 208 makes several passes through medium element 206, thus increasing the opportunity for absorption. Those skilled in the art will understand that a suitable choice of neodymium concentration in the YLF or a suitable distribution of the pump diodes around the rod could eliminate the need for the reflective material. Those skilled in the art will also understand that the laser beams emitted by diode lasers 208 are typically diverse, and are shown in FIG. 2 as narrow rays for the sake of clarity.

Figure 4:
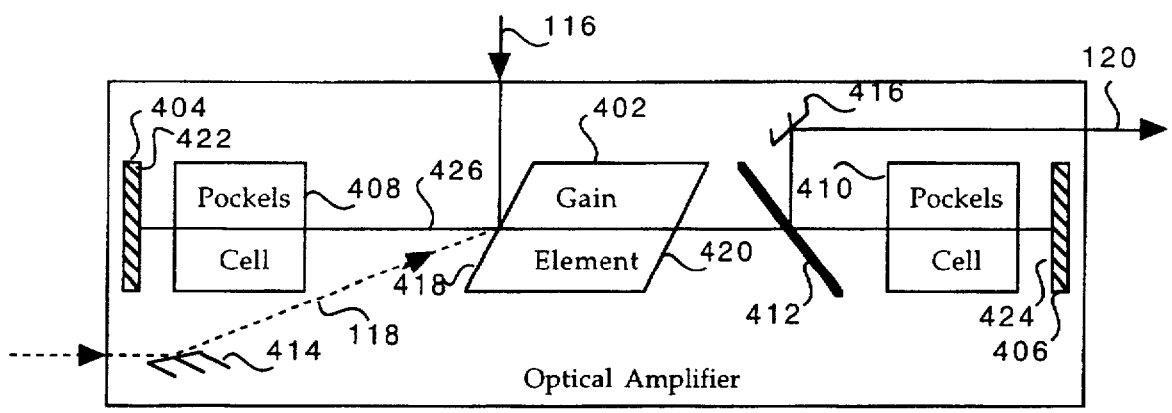
FIG. 4 is a block diagram of the optical amplifier of FIG. 1.

FIG. 4 is a block diagram detailing optical amplifier 112, which includes a gain medium element 402, first and second reflectors 404 and 406, first and second Pockels cells 408 and 410, a polarizing beam splitter 412, and first and second beam directors 414 and 416. In the preferred embodiment, gain medium element 402 is a cylindrical rod of titanium-doped sapphire (Ti:Al$_2$O$_3$) having a first end surface 418 and a second end surface 420, each formed by a Brewster cut. Reflectors 404 and 406 each have a highly reflective surface 422 and 424 respectively, and are positioned facing each other at opposite ends of gain medium element 402 with their reflective surfaces 422 and 424 perpendicular to an optical path 426 passing through both end surfaces 418 and 420 of gain medium element 402. First and second Pockels cells 408 and 410 are disposed in optical path 426, between gain medium element 402 and first and second reflectors 404 and 406, respectively. Polarizing beam splitter 412 is disposed in optical path 426 between gain medium element 402 and second Pockels cell 410.

During operation, seed-pulses emitted by seed-pulse source 110 along optical path 116 impinge on first end surface 418 of gain medium element 402. Although the angle appears smaller in FIG. 4 for purposes of illustration, optical path 116 forms an angle of about 114° with optical path 426. The reflected seed-pulse is polarized, and optical path 116 is oriented relative to gain element 402 such that the polarized seed-pulse is reflected along optical path 426 toward first Pockels cell 408. First Pockels cell 408 selectively switches a seed-pulse into optical amplifier 112, where the pulse is amplified during several passes along optical path 426 between reflectors 404 and 406.

The energy for the amplification that occurs in optical amplifier 112 is provided by amplifier pump laser 114. First beam director 414 redirects the pump light emitted from amplifier pump laser 114 along optical path 118 to impinge on first end surface 418 of gain medium element 402. The pump light passes through first end surface 418 and is absorbed by the atoms of gain medium element 402, exciting them to a metastable state. The excited atoms are induced by the oscillating seed-pulse to re-emit the absorbed light into the seed-pulse state, thereby amplifying the seed-pulse.

After a number of passes between first and second reflectors 404 and 406 along optical path 426, second Pockels cell 410 ejects the amplified pulse by altering its polarization such that polarizing beam splitter 412 directs the pulse toward second beam director 416, which in turn directs the pulse along optical path 120 out of optical amplifier 112. Those skilled in the art will understand that there are many optical switching techniques that can be used to switch pulses into and out of the regenerative amplifier resonator. These include a single Pockels cell, multiple Pockels cells, a combination of a Pockels cell and a wave plate, acousto-optic cells, Faraday isolators, and a multitude of other combinations of the foregoing. The invention contemplates the use of each of these and other types of switching techniques, and is limited only by the appended claims.

While amplifier 112 of the preferred embodiment of the invention has been disclosed as a linear regenerative amplifier, it will be obvious to those skilled in the art that the invention may be practiced with other types of optical amplifiers. In fact, the invention contemplates the use of other types of amplifiers, and is limited only by the appended claims.

Figure 5A:
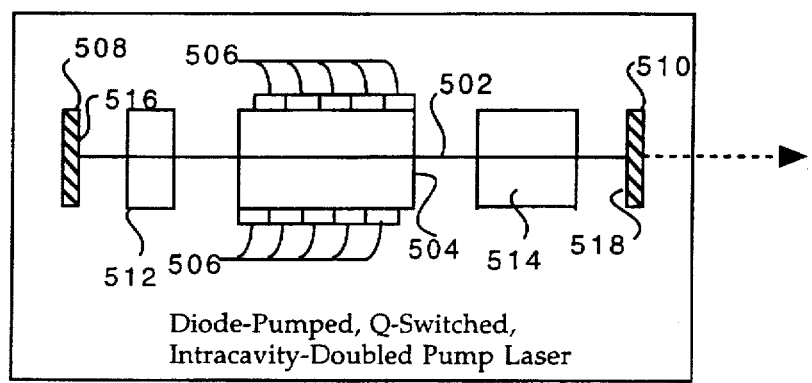
FIG. 5A is a block diagram of an alternate amplifier pump laser.

FIG. 5A is a block diagram of an alternate amplifier pump laser 114a characterized by a straight-line optical path 502. Alternate pump laser 114a includes a laser medium element 504, a plurality of diode lasers 506, a reflector 508, an output coupler 510, a Q-switch 512, and a frequency altering device 514. Diode lasers 506 are disposed along the lateral surface of laser medium element 504, and when provided with electrical current emit laser light into element 504 which excites the atoms of element 504 to a metastable state. The relaxation of the excited atoms is accompanied by the emission of light of a first frequency (w), some of which travels along optical path 502.

Reflector 508 and output coupler 510 are positioned to face each other at opposite ends of optical path 502. Reflector 508 and output coupler 510 each have a reflective surface 516 and 518 respectively which is substantially perpendicular to optical path 502. Therefore, any light traveling along optical path 502 which is incident on either reflector 508 or output coupler 510 is reflected back along optical path 502. As the light oscillates back and forth between reflector 508 and output coupler 510, the growing reflected wave induces the emission of additional light into the reflected wave state, thus amplifying the reflected wave.

Q-switch 512 is disposed in optical path 502 between reflector 508 and laser medium element 504 and selectively frustrates or permits oscillation. When oscillation is frustrated, the excited atoms are not induced to emit light, and the number of excited atoms can, therefore, be greatly increased. Then, when Q-switch 512 permits oscillation, a powerful pulse will be generated as the large number of excited atoms drop to the lower state, emitting light as they make the transition.

Frequency altering device 514 is disposed in optical path 502, between laser medium element 504 and output coupler 510. As the light of frequency (w) emitted by laser medium element 504 travels along optical path 502 through device 514, the frequency of a portion of the beam is doubled, creating a second wave at the doubled frequency (2w). Output coupler 510 is designed to be highly reflective to the first frequency (w) but transparent to the second (2w) frequency, and therefore passes the second (2w) wave as an output pulse along optical path 118.

Figure 5B:
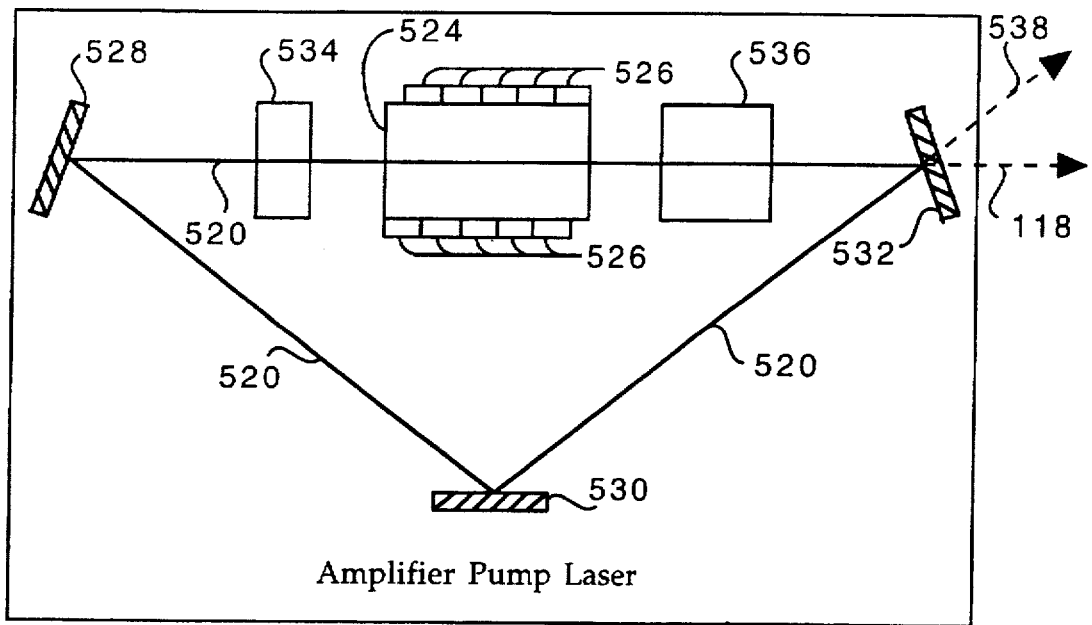
FIG. 5B is a block diagram of an alternative amplifier pump laser having a bi-directional, ring configuration.

FIG. 5B shows an alternate bi-directional, ring-configured amplifier pump laser 114b, which could be substituted for amplifier pump laser 114. Pump laser 114b is characterized by a triangular optical path 520, and includes a laser medium element 524, a plurality of diode lasers 526, a first beam director 528, a second beam director 530, an output coupler 532, a Q-switch 534, and a frequency altering device 536. Diode lasers 526 stimulate laser medium element 524 to emit light of a first frequency in both directions along optical path 520. As described above, Q-switch 534 pulses laser 114b, and frequency altering device 536 doubles the frequency of a portion of the light passing therethrough. Beam directors 528 and 530 are disposed at two of the vertices of optical path 520 to direct light incident from one leg of optical path 520 along the adjacent leg. Output coupler 532 is disposed at the remaining vertex of optical path 520 and is designed to reflect light of the first frequency and transmit light of the doubled frequency as output beams along optical paths 118 and 538.

It will be clear to one skilled in the art that optical path 520 need not be triangular. With the addition of an appropriate number of beam directors optical path 520 could be shaped as any multi-sided polygon. Further, additional laser medium elements may be disposed in one or more of the additional legs to create a more powerful multi-element laser. All such modifications are considered to be within the scope of the present invention.

The dual output is a result of the bi-directional operation of laser 114b. Light traveling along optical path 520 in a clockwise direction will be emitted along optical path 118, whereas light traveling along optical path 520 in a counter-clockwise direction will be emitted along optical path 538. Bi-directional operation is desirable when two output beams are required. When only one output beam is required, the second beam results in wasted power, and uni-directional operation is preferred.

Figure 5C:
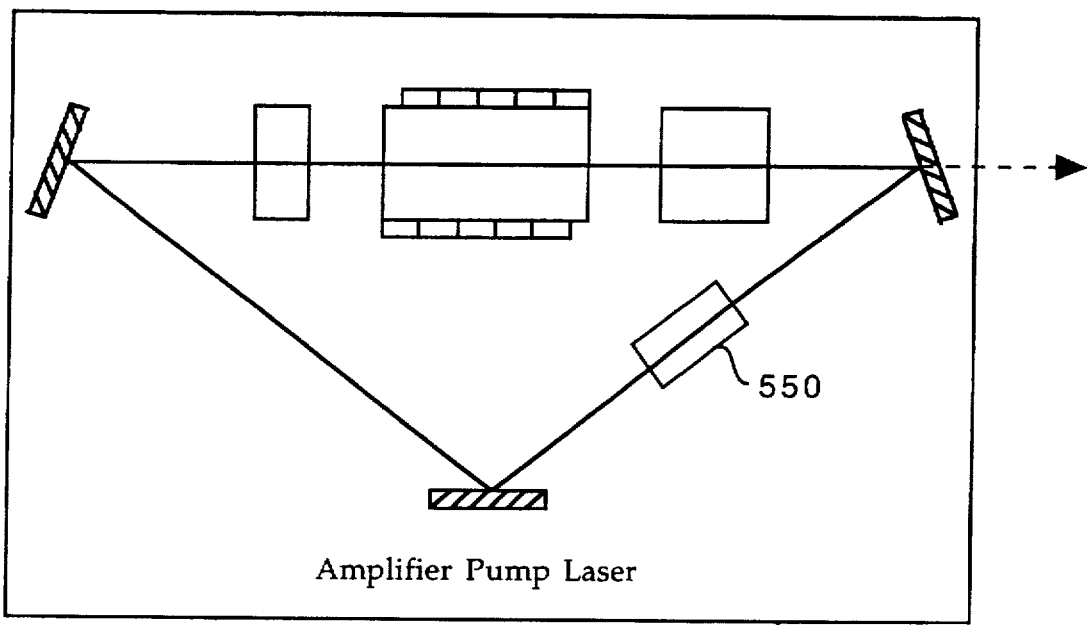
FIG. 5C is a block diagram of an alternative amplifier pump laser having a uni-directional, ring configuration.

FIG. 5C shows an alternate unidirectional, ring-configured amplifier pump laser 114c, which could be substituted for amplifier pump laser 114. Ring laser 114c is substantially identical to ring laser 114b described above, but includes an additional uni-directional device (optical diode) 550. Typically, optical diodes include a Faraday rotator, an optically active crystal and a Brewster plate. Faraday rotators rotate the polarization of a beam in a direction of rotation that is not dependent on the direction of travel of the wave, but the direction of rotation by the optical crystal does depend on the direction of travel of the wave. Therefore, in one direction the effect of the two components combine to produce a net rotation, but in the other direction they offset, producing no net rotation. The Brewster plate then selectively introduces a loss in the direction undergoing a net rotation, frustrating oscillation in that direction. Other means for encouraging unidirectional oscillation are known to those skilled in the art, and are considered to be within the scope of the invention.

Figure 6A:
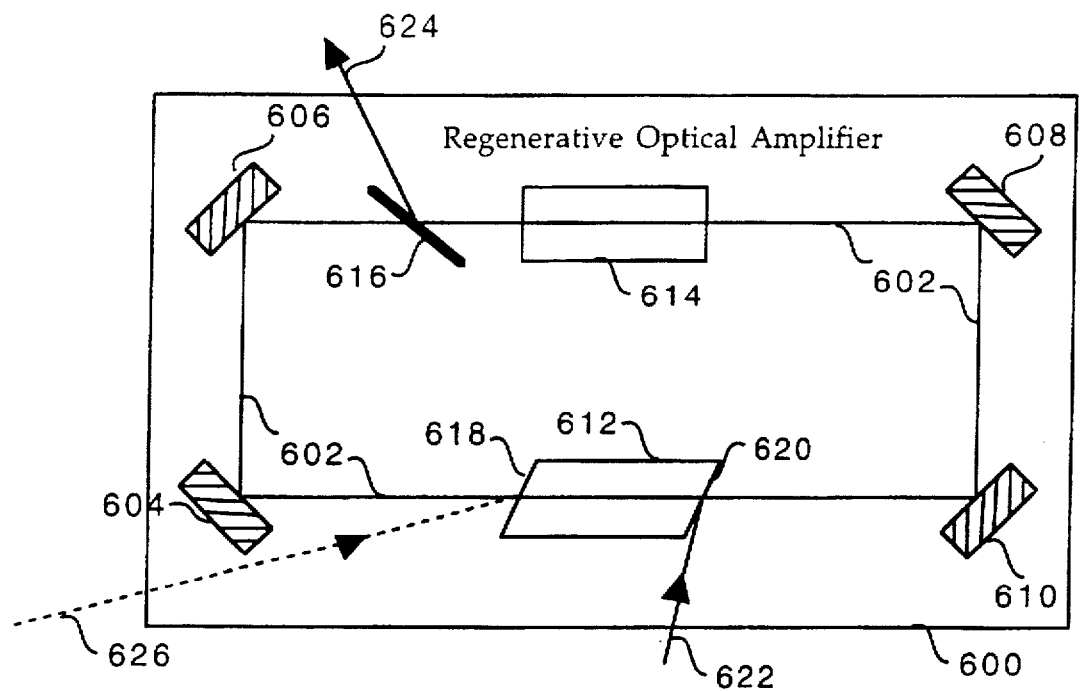
FIG. 6A is a block diagram of an alternate ring-configured optical amplifier.

FIG. 6A shows an alternate ring-configured, regenerative optical amplifier characterized by a rectangular optical path 602 and including four beam directors 604, 606, 608, and 610, a gain media element 612, a Pockels cell 614 and a polarizing beam splitter 616. Beam directors 604, 606, 608, and 610 are each disposed at one of the vertices of optical path 602, to redirect light incident from one leg of optical path 602 along the adjacent leg. Gain element 612 has a first end surface 618 and a second end surface 620, and is disposed between beam directors 604 and 610 such that optical path 602 passes through first and second end surfaces 618 and 620 of gain element 612. Pockels cell 614 and polarizing beam splitter 616 are disposed in optical path 602 between beam directors 606 and 608, with beam splitting polarizer 616 nearer beam director 606.

A polarized seed-pulse enters amplifier 600 via optical path 622, and is reflected along optical path 602 toward beam director 610 by the second end surface 620 of gain element 612. The seed-pulse travels counter-clockwise around optical path 602, first being reflected by beam directors 610 and 608, then passing through Pockels cell 614 which alters its polarization and, thus, it passes through polarizing beam splitter 616, then being reflected by beam directors 606 and 604, and finally passing through gain element 612.

The seed-pulse is amplified as it repeats the loop around optical path 602. The power for amplification is provided by a pump laser whose output beam enters amplifier 600 via optical path 626. The pump beam passes through first end surface 618 of gain element 612 where it is absorbed by the active atoms of the gain medium, exciting them to a metastable state. The oscillating seed-pulse induces the excited atoms to re-emit the absorbed light into the seed-pulse state, thereby amplifying the seed-pulse. After a number of amplifying passes around optical path 602, Pockels cell 614 ejects the pulse by altering its polarization such that polarizing beam splitter 616 directs the pulse along optical path 624 out of optical amplifier 600. Those skilled in the art will recognize that there many techniques, for example those described above, for switching a pulse into and out of a regenerative amplifier, and the present invention contemplates the use of any such switching technique.

Figure 6B:
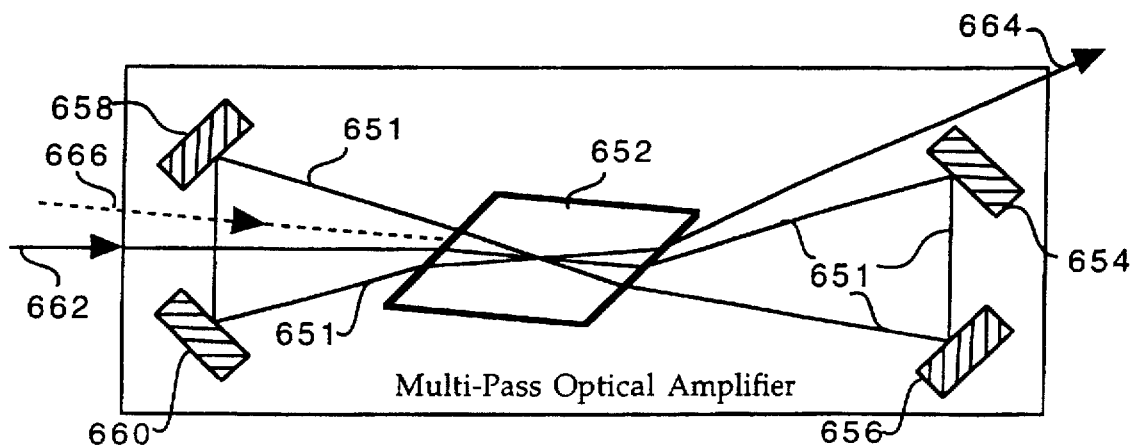
FIG. 6B is a block diagram of an alternate multi-pass optical amplifier.

FIG. 6B shows an optional multi-pass optical amplifier 650, characterized by a "bow tie" shaped optical path 651, including a gain element 652 and four beam directors 654, 656, 658, and 660. A seed-pulse enters amplifier 650 along optical path 662 and passes through gain element 652 and proceeds along optical path 651 toward beam director 654. Beam director 654 redirects the pulse along the next leg of optical path 651 toward beam director 656, which in turn redirects the pulse back through gain element 652 and toward beam director 658. Beam director 658 then directs the pulse toward beam director 660, which in turn directs the pulse through gain element 652 a third time and out of amplifier 650 via optical path 664. The pulse is amplified each time it passes through gain element 652, with power provided by a pump laser beam.

Those skilled in the art will recognize that there are many variations on this type of amplifier. In its simplest form, an amplifier of this type could consist simply of a gain element and a pumping means, with the beam making only one pass (although this is not technically a multi-pass amplifier) through the element. At the other extreme, a large number of beam directors could be arranged around the gain element, greatly increasing the number of passes by the beam through the gain element.

The present invention has been disclosed with reference to a preferred embodiment and several alternate embodiments. Specific details have been set forth, such as the number of medium elements in a pump laser or amplifier, specific beam paths, and methods for switching pulses into and out of an amplifier. Those skilled in the art will understand that the invention may be practiced apart from the specific details set forth herein.

We claim:

1. A system for amplifying optical pulses comprising:
   a seed-pulse source for producing optical seed-pulses;
   an optical amplifier disposed to receive said seed-pulses from said seed-pulse source, for receiving and amplifying said seed pulses and for outputting amplified seed-pulses; and
   a diode-pumped, amplifier pumping laser for providing optical energy to said optical amplifier for the amplification of said seed-pulses, said amplifier pumping laser including an intracavity frequency altering device and a switching means for selectively frustrating or allowing optical resonance, thereby enabling said amplifier pumping laser to emit pulses of laser light.

2. The system of claim 1 wherein said optical amplifier is a regenerative amplifier.

3. The system of claim 2 wherein said regenerative amplifier is a linear regenerative amplifier.

4. The system of claim 3 wherein said amplifier pumping laser comprises:
   a laser medium element for emitting a laser beam at a first optical frequency along an optical path passing through said element;
   a diode laser for emitting laser light to excite said laser medium element to emit said laser beam;
   a first reflector disposed at a first end of said optical path for redirecting said beam back along said optical path;
   a frequency altering device interposed in said optical path for altering the frequency of a portion of said beam from said first frequency to a second frequency;
   an output coupler disposed to reflect light of said first frequency along said optical path and to pass light of said second frequency as amplifier pump laser output pulses; and
   a switching device disposed in said optical path and responsive to an external signal, for selectively frustrating or allowing optical resonance.

5. The system of claim 4 wherein said laser medium element is a cylindrical solid.

6. The system of claim 5 wherein said laser medium element includes neodymium.

7. The system of claim 6 wherein said laser medium element further includes YLF.

8. The system of claim 7 wherein said diode laser is disposed to side pump said laser medium element.

9. The system of claim 8 wherein said switching device is an acousto-optical cell.

10. The system of claim 9 wherein said frequency altering device is an LBO crystal.

11. The system of claim 9 wherein said frequency altering device is a BBO crystal.

12. The system of claim 9 wherein said frequency altering device is a KTF crystal.

13. The system of claim 9 wherein said frequency altering device is a KDP crystal.

14. The system of claim 8 wherein said switching device is an electro-optical cell.

15. The system of claim 7 wherein said diode laser is disposed to end pump said laser medium element.

16. The system of claim 6 wherein said laser medium element further includes YAG.

17. The system of claim 16 wherein said switching device is an acousto-optical cell.

18. The system of claim 16 wherein said switching device is an electro-optical cell.

19. The system of claim 6 wherein said laser medium element further includes YSGG.

20. The system of claim 6 wherein said laser medium element further includes vanadate.

21. The system of claim 6 wherein said laser medium element further includes glass.

22. The system of claim 5 wherein said laser medium element includes erbium.

23. The system of claim 5 wherein said laser medium element includes thorium.

24. The system of claim 5 wherein said laser medium element includes holmium.

25. The system of claim 4 wherein said output coupler is disposed at a second end of said optical path, for reflecting light of said first frequency back along said optical path and passing light of said second frequency as amplifier pump laser output pulses, thereby establishing an optical resonator between said first reflector and said output coupler.

26. The system of claim 25 wherein said diode laser is disposed to side pump said laser medium element.

27. The system of claim 25 wherein said diode laser is disposed to end pump said laser medium element.

28. The system of claim 4 further including a second reflector disposed at a second end of said optical path for redirecting said beam back along said optical path, and wherein said output coupler redirects said light of said first frequency along said optical path between said first and second reflectors, thereby establishing an optical resonator between said first and second reflectors.

29. The system of claim 28 wherein said diode laser is disposed to side pump said laser medium element.

30. The system of claim 28 wherein said diode laser is disposed to end pump said laser medium element.

31. The system of claim 3 wherein said amplifier pump laser comprises:
    a laser medium element for emitting a laser beam at a first optical frequency;
    a diode laser for emitting laser light to excite said laser medium element to emit said laser beam;
    a beam director for directing said beam along a looped optical path;
    a frequency altering device interposed in said optical path for altering the frequency of a portion of said beam, from said first frequency to a second frequency;
    an output coupler for reflecting light of said first frequency along said optical path and passing light of said second frequency as amplifier pump laser output; and
    a switching device, responsive to an external signal, for selectively frustrating or allowing optical resonance.

32. The system of claim 31 wherein said diode laser is disposed to side pump said laser medium element.

33. The system of claim 31 wherein said diode laser is disposed to end pump said laser medium element.

34. The system of claim 2 wherein said regenerative amplifier is ring configured.

35. The system of claim 34 wherein said amplifier pumping laser comprises:
    a laser medium element for emitting a laser beam at a first optical frequency along an optical path passing through said element;
    a diode laser for emitting laser light to excite said laser medium element to emit said laser beam;
    a first reflector disposed at a first end of said optical path for redirecting said beam back along said optical path;
    a frequency altering device interposed in said optical path for altering the frequency of a portion of said beam from said first frequency to a second frequency;
    an output coupler disposed to reflect light of said first frequency along said optical path and to pass light of said second frequency as amplifier pump laser output pulses; and
    a switching device disposed in said optical path and responsive to an external signal, for selectively frustrating or allowing optical resonance.

36. The system of claim 35 wherein said output coupler is disposed at a second end of said optical path, for reflecting light of said first frequency back along said optical path and passing light of said second frequency as amplifier pump laser output pulses, thereby establishing an optical resonator between said first reflector and said output coupler.

37. The system of claim 35 further including a second reflector disposed at a second end of said optical path for redirecting said beam back along said optical path, and wherein said output coupler redirects said light of said first frequency along said optical path between said first and second reflectors, thereby establishing an optical resonator between said first and second reflectors.

38. The system of claim 34 wherein said amplifier pump laser comprises:
    a laser medium element for emitting a laser beam at a first optical frequency;
    a diode laser for emitting laser light to excite said laser medium element to emit said laser beam;
    a beam director for directing said beam along a looped optical path;
    a frequency altering device interposed in said optical path for altering the frequency of a portion of said beam, from said first frequency to a second frequency;
    an output coupler for reflecting light of said first frequency along said optical path and passing light of said second frequency as amplifier pump laser output; and
    a switching device, responsive to an external signal, for selectively frustrating or allowing optical resonance.

39. The system of claim 1 wherein said amplifier is a single-pass optical amplifier.

40. The system of claim 1 wherein said amplifier is a multi-pass optical amplifier.

41. The system of claim 1 wherein said amplifier pumping laser comprises:
    a laser medium element for emitting a laser beam at a first optical frequency along an optical path passing through said element;
    a diode laser for emitting laser light to excite said laser medium element to emit said laser beam;
    a first reflector disposed at a first end of said optical path for redirecting said beam back along said optical path;
    a frequency altering device interposed in said optical path for altering the frequency of a portion of said beam from said first frequency to a second frequency;
    an output coupler disposed to reflect light of said first frequency along said optical path and to pass light of said second frequency as amplifier pump laser output pulses; and
    a switching device disposed in said optical path and responsive to an external signal, for selectively frustrating or allowing optical resonance.

42. The system of claim 41 wherein said laser medium element is a cylindrical solid.

43. The system of claim 42 wherein said diode laser is disposed to side pump said laser medium element.

44. The system of claim 41 wherein said output coupler is disposed at a second end of said optical path, for reflecting light of said first frequency back along said optical path and passing light of said second frequency as amplifier pump laser output pulses, thereby establishing an optical resonator between said first reflector and said output coupler.

45. The system of claim 44 wherein said laser medium element is a cylindrical solid.

46. The system of claim 45 wherein said diode laser is disposed to side pump said laser medium element.

47. The system of claim 41 further including a second reflector disposed at a second end of said optical path for redirecting said beam back along said optical path, and wherein said output coupler redirects said light of said first frequency along said optical path between said first and second reflectors, thereby establishing an optical resonator between said first and second reflectors.

48. The system of claim 47 wherein said laser medium element is a cylindrical solid.

49. The system of claim 48 wherein said diode laser is disposed to side pump said laser medium element.

50. The system of claim 1 wherein said amplifier pump laser comprises:

a laser medium element for emitting a laser beam at a first optical frequency;

a diode laser for emitting laser light to excite said laser medium element to emit said laser beam;

a beam director for directing said beam along a looped optical path;

a frequency altering device interposed in said optical path for altering the frequency of a portion of said beam, from said first frequency to a second frequency;

an output coupler for reflecting light of said first frequency along said optical path and passing light of said second frequency as amplifier pump laser output; and a switching device, responsive to an external signal, for selectively frustrating or allowing optical resonance.

51. The system of claim 50 wherein said laser medium element is a cylindrical solid.

52. The system of claim 51 wherein said diode laser is disposed to side pump said laser medium element.

* * * * *